(12) United States Patent
Ramanathan et al.

(10) Patent No.: US 9,294,424 B2
(45) Date of Patent: *Mar. 22, 2016

(54) MULTIMODAL CONVERSATION TRANSFER

(71) Applicant: Microsoft Corporation, Redmond, WA (US)

(72) Inventors: Rajesh Ramanathan, Redmond, WA (US); Amritansh Raghav, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,521

(22) Filed: Sep. 12, 2014

(65) Prior Publication Data

US 2015/0106455 A1      Apr. 16, 2015

Related U.S. Application Data

(63) Continuation of application No. 12/146,428, filed on Jun. 25, 2008, now Pat. No. 8,862,681.

(51) Int. Cl.
*G06F 15/16* (2006.01)
*H04L 12/58* (2006.01)
*H04L 29/08* (2006.01)

(52) U.S. Cl.
CPC ........... *H04L 51/16* (2013.01); *G06F 15/16* (2013.01); *H04L 51/36* (2013.01); *H04L 67/148* (2013.01)

(58) Field of Classification Search
USPC .......... 709/206, 207, 205, 204, 203, 227, 228
See application file for complete search history.

(56) References Cited

U.S. PATENT DOCUMENTS

| | | | |
|---|---|---|---|
| 4,972,437 | A | 11/1990 | Citron et al. |
| 5,684,870 | A | 11/1997 | Maloney et al. |
| 6,119,147 | A | 9/2000 | Toomey et al. |
| 6,704,396 | B2 | 3/2004 | Parolkar et al. |
| 6,912,581 | B2 | 6/2005 | Johnson |
| 7,027,586 | B2 | 4/2006 | Bushey et al. |
| 7,254,227 | B2 | 8/2007 | Mumick |
| 7,315,613 | B2 | 1/2008 | Kleindienst et al. |
| 7,454,608 | B2 | 11/2008 | Gopalakrishnan |
| 7,490,125 | B1 | 2/2009 | Jagadeesan |
| 7,657,652 | B1 | 2/2010 | Balaji |
| 7,716,682 | B2 | 5/2010 | Maes |
| 7,801,728 | B2 | 9/2010 | Ben-David |

(Continued)

OTHER PUBLICATIONS

Baggia, "Speech Technologies and Multimodality: The Solution for New Advanced Services", Loquendo Vocal Technology and Services White Paper, Apr. 28, 2005.

(Continued)

*Primary Examiner* — Lan-Dai T Truong
(74) *Attorney, Agent, or Firm* — Aaron Hoff; Micky Minhas

(57) ABSTRACT

In one embodiment, a user may transfer a multimodal conversation. A multimodal conversation may have a first mode communication session and a second mode communication session. A first user point of presence may execute a first transfer of the first mode communication session with a first partner point of presence from the first user point of presence to a first target point of presence. A second user point of presence may execute a second transfer of the second mode communication session with a second partner point of presence from the second user point of presence to a second target point of presence.

20 Claims, 8 Drawing Sheets

(56) References Cited

U.S. PATENT DOCUMENTS

| | | | |
|---|---|---|---|
| 7,984,287 | B2 | 7/2011 | Gopalakrishnan |
| 8,073,700 | B2 | 12/2011 | Jaramillo |
| 8,213,917 | B2 | 7/2012 | Anderl |
| 8,380,516 | B2 | 2/2013 | Jaramillo |
| 8,452,838 | B2 | 5/2013 | Ono |
| 8,543,704 | B2 | 9/2013 | Bowater |
| 8,693,434 | B2 * | 4/2014 | Sinnreich et al. ............. 370/331 |
| 8,862,681 | B2 | 10/2014 | Ramanathan |
| 2003/0162561 | A1 | 8/2003 | Johnson |
| 2003/0167172 | A1 | 9/2003 | Johnson |
| 2005/0021826 | A1 * | 1/2005 | Kumar ........................ 709/232 |
| 2005/0097311 | A1 | 5/2005 | Gopalakrishnan |
| 2005/0131911 | A1 | 6/2005 | Chi |
| 2006/0053379 | A1 | 3/2006 | Henderson et al. |
| 2006/0072542 | A1 | 4/2006 | Sinnreich |
| 2006/0104259 | A1 | 5/2006 | Caballero-McCann et al. |
| 2006/0136870 | A1 | 6/2006 | Wilson |
| 2006/0225117 | A1 | 10/2006 | Ono |
| 2006/0229880 | A1 | 10/2006 | White |
| 2007/0049276 | A1 | 3/2007 | Rimoni et al. |
| 2007/0115931 | A1 | 5/2007 | Anderson |
| 2007/0118656 | A1 | 5/2007 | Anderson |
| 2007/0157216 | A1 | 7/2007 | Maes |
| 2007/0162614 | A1 | 7/2007 | Patel et al. |
| 2007/0263556 | A1 | 11/2007 | Harris et al. |
| 2007/0281682 | A1 | 12/2007 | Raju et al. |
| 2008/0019390 | A1 | 1/2008 | Singh et al. |
| 2008/0075240 | A1 | 3/2008 | Ramanathan et al. |
| 2008/0085746 | A1 | 4/2008 | Ray et al. |
| 2008/0098306 | A1 | 4/2008 | Gao |
| 2008/0147406 | A1 | 6/2008 | Da Palma |
| 2008/0208587 | A1 | 8/2008 | Ben-David |
| 2008/0232248 | A1 | 9/2008 | Barave et al. |
| 2008/0294979 | A1 | 11/2008 | Chi |
| 2009/0094451 | A1 | 4/2009 | Gopalakrishnan |
| 2009/0144428 | A1 | 6/2009 | Bowater |
| 2009/0279506 | A1 | 11/2009 | Sinnreich et al. |
| 2012/0213343 | A1 | 8/2012 | Gao |
| 2012/0245946 | A1 | 9/2012 | Anderl |
| 2013/0158994 | A1 | 6/2013 | Jaramillo et al. |

OTHER PUBLICATIONS

Larson, ed., "W3C Multimodal Interaction Framework", W3C, May 6, 2003.

Cross, ed., "XHTML +Voice Profile 1.1", Jan. 28, 2003.

* cited by examiner

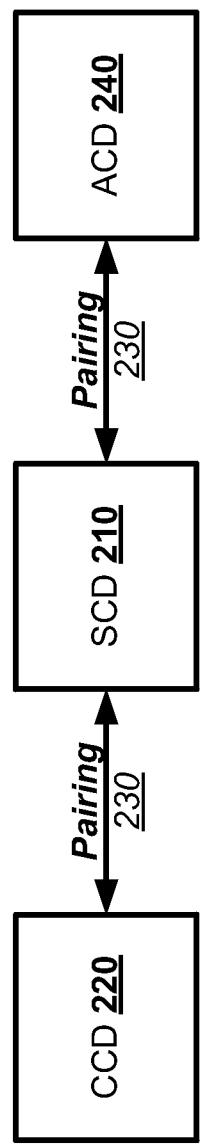

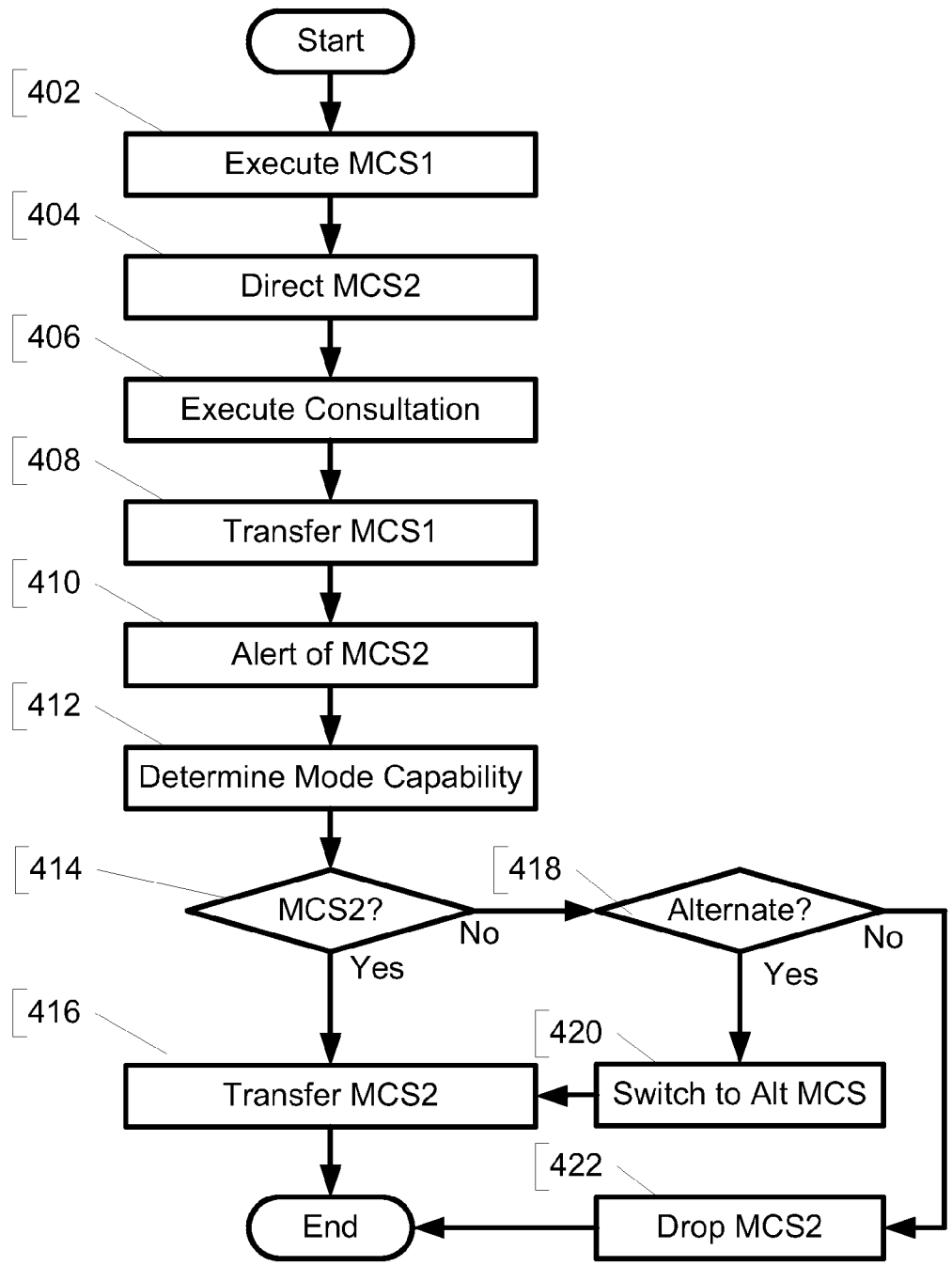

MULTIMODAL CONVERSATION TRANSFER

RELATED APPLICATION(S)

This application is a Continuation of, and claims benefit from, U.S. patent application Ser. No. 12/146,428 that was filed on Jun. 25, 2008, and that is incorporated herein by reference in its entirety.

BACKGROUND

A personal computer that integrates internet functionality may be used to greatly increase the ability of a user to communicate across several modalities. A user may contact a communication partner using electronic mail, or e-mail, in which a discrete set of text may be sent from the user to the communication partner at a time convenient to an e-mail server. The user may associate a file or application with the text, sending the file or application as an attachment to the e-mail. A user may enact a real-time conversation with a communication partner using instant messaging, in which sets of text may be exchanged between the user and the communication partner instantaneously.

The personal computer that integrates internet functionality may integrate services normally associated with other devices. A personal computer with audio input and output capability may be modified by software to act as a telephone for the user. The user may exchange real-time audio data with a communication partner, allowing a conversation to take place. Further, a personal computer with digital image capturing capability may act as a video telephone. A user and a communication partner may exchange synchronized video and audio data, allowing a greater flexibility in the types of communications that may take place.

Many existing communication technologies may integrate these computing innovations. One example would be the internet protocol (IP) telephone. An IP telephone may use voice over IP (VOIP) to transmit telephone calls over the internet, rather than a public switched telephone network.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to transferring conversations that may occur across multiple modalities, such as instant messaging, voice, video, and other conversational modalities. A first user point of presence may execute a first transfer of a first mode communication session with a first partner point of presence from the first user point of presence to a first target point of presence. A second user point of presence may execute a second transfer of a second mode communication session with a second partner point of presence from the second user point of presence to a second target point of presence.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 2 illustrates, in a block diagram, one embodiment of a set of paired communication devices.

Figure 3A:
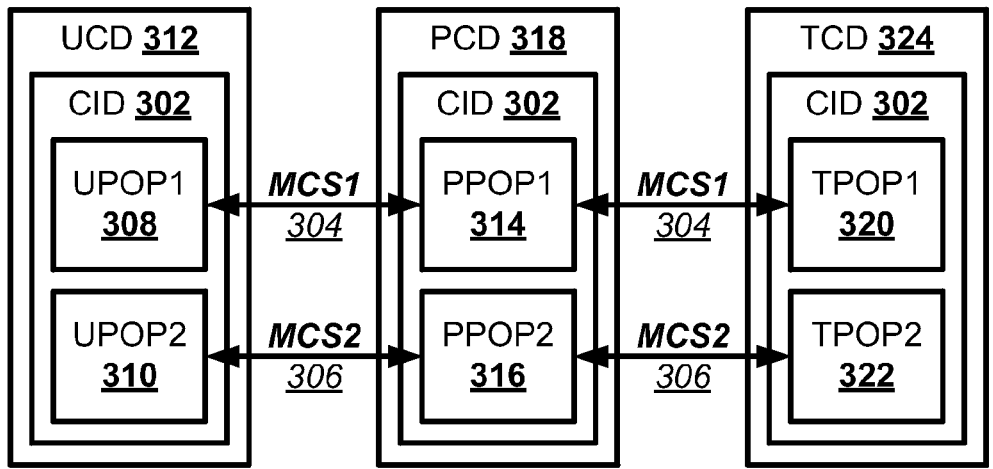
Figure 3B:
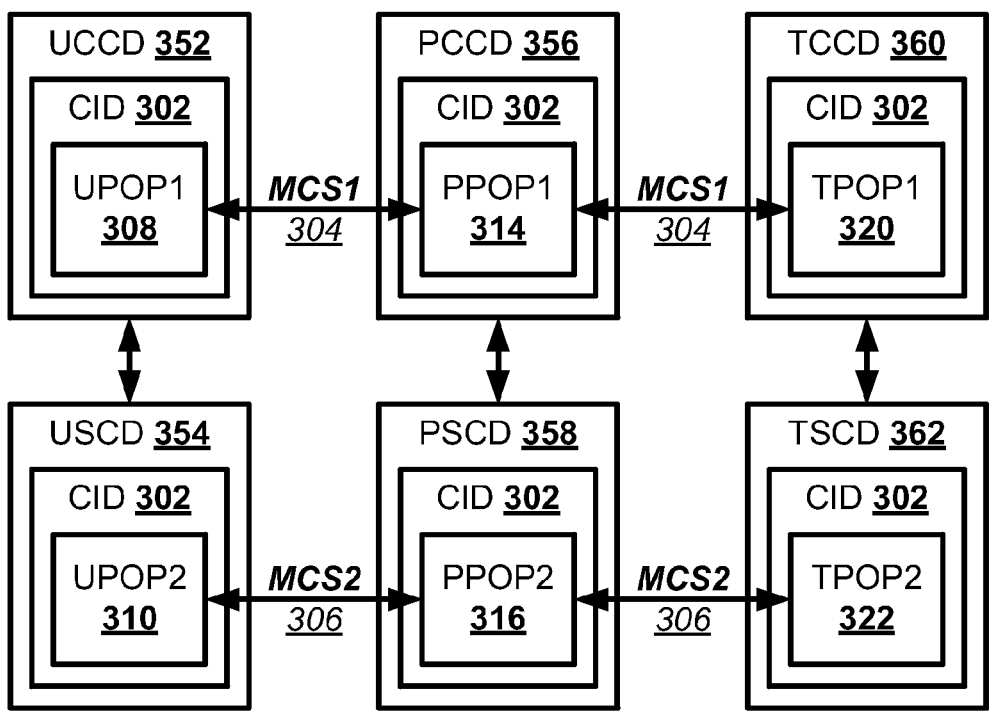

FIGS. 3a-b illustrate, in block diagrams, two embodiments of a multimodal conversation using a user communication system.

FIG. 4 illustrates, in a flowchart, one method of transferring a multimodal conversation.

Figure 5:
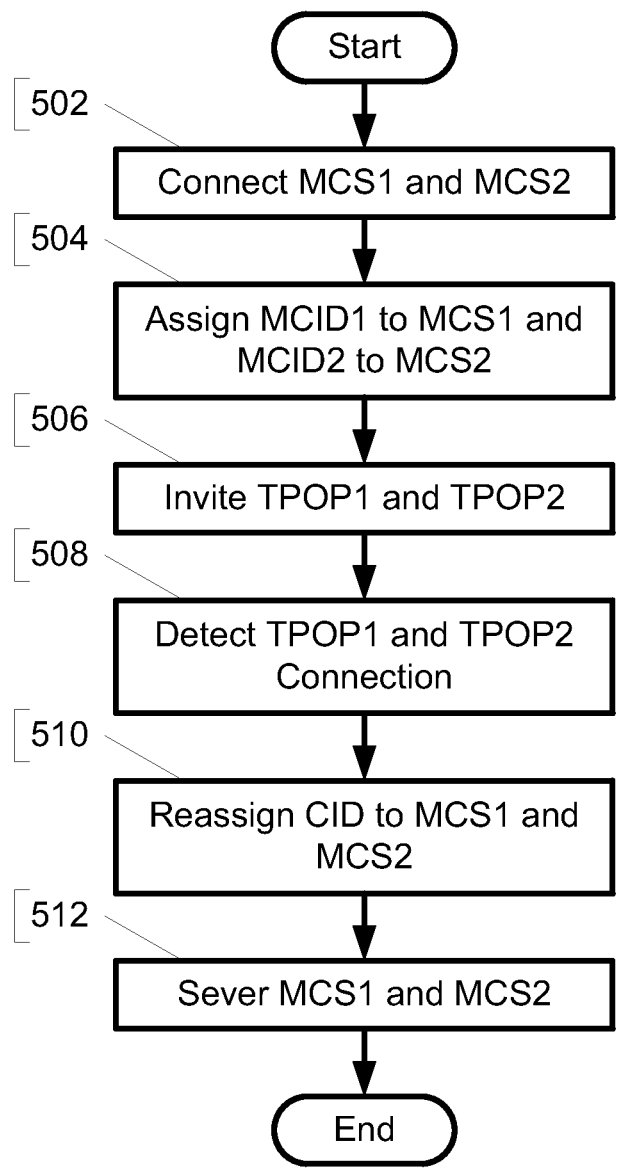

FIG. 5 illustrates, in a flowchart, one method of transferring a multimodal conversation using a communication server.

Figure 6:
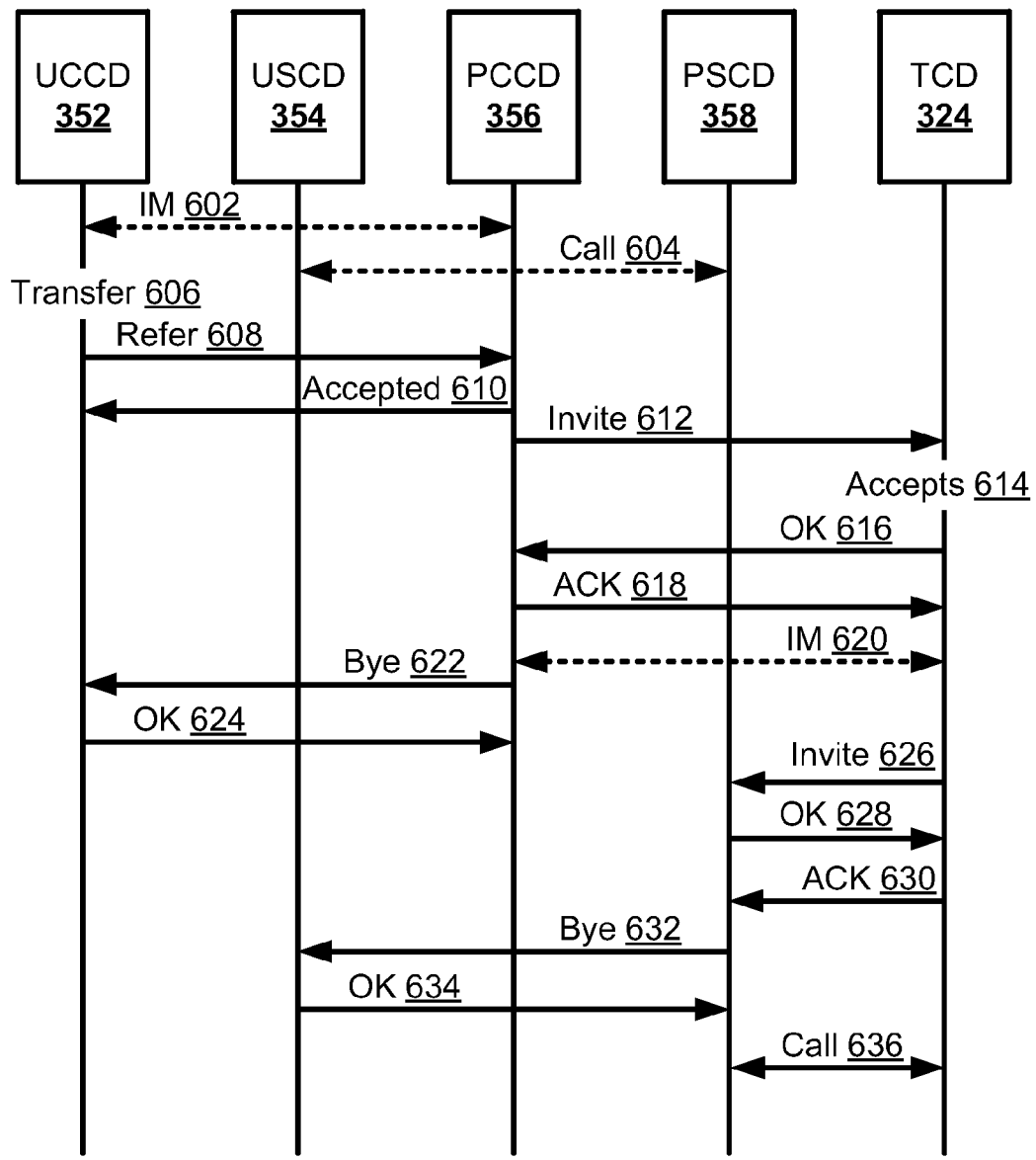

FIG. 6 illustrates, in a call flow diagram, one embodiment of a method for a user initiated, target completed multimodal call transfer.

Figure 7:
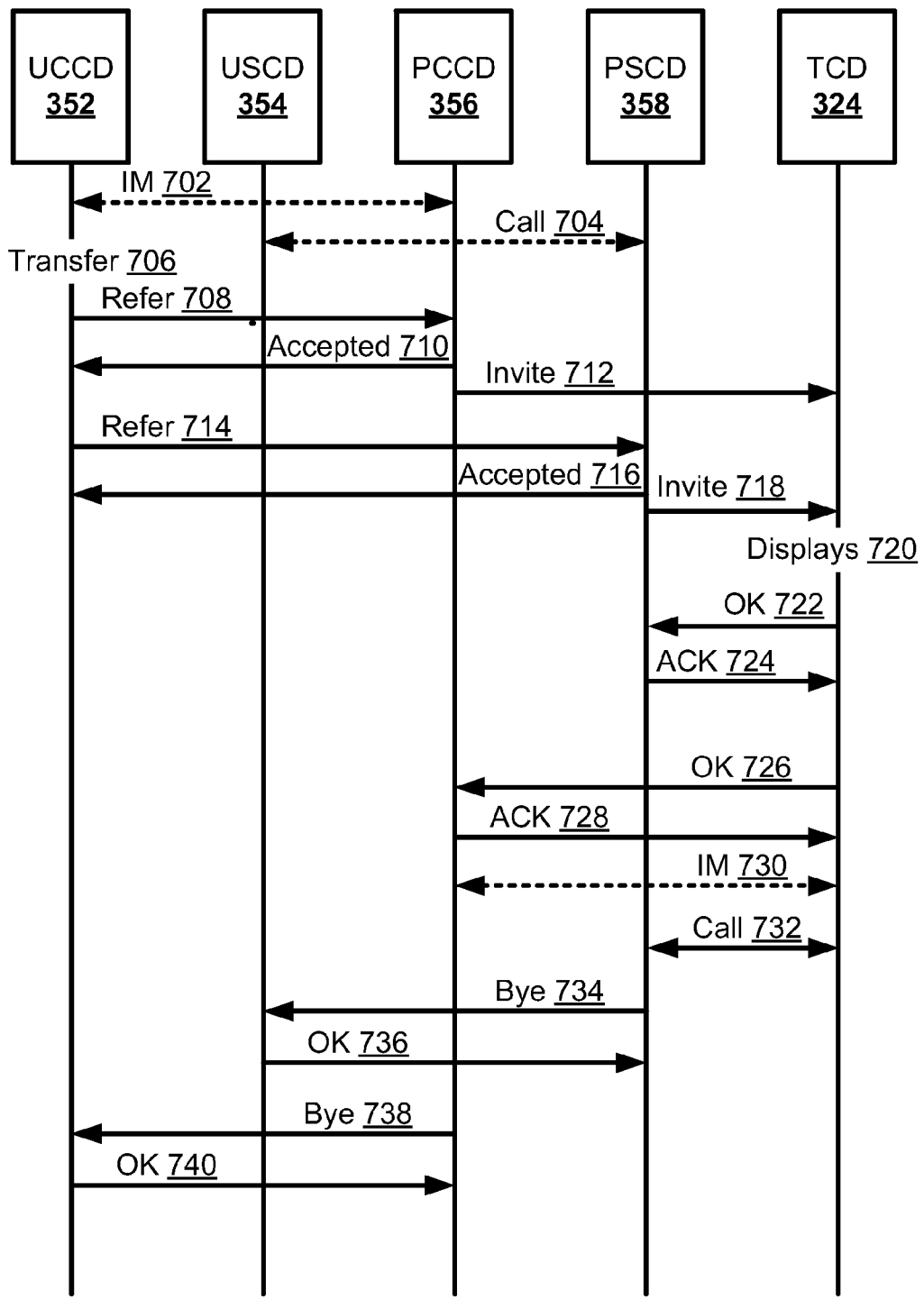

FIG. 7 illustrates, in a call flow diagram, one embodiment of a method for a user controlled multimodal call transfer.

Figure 8:
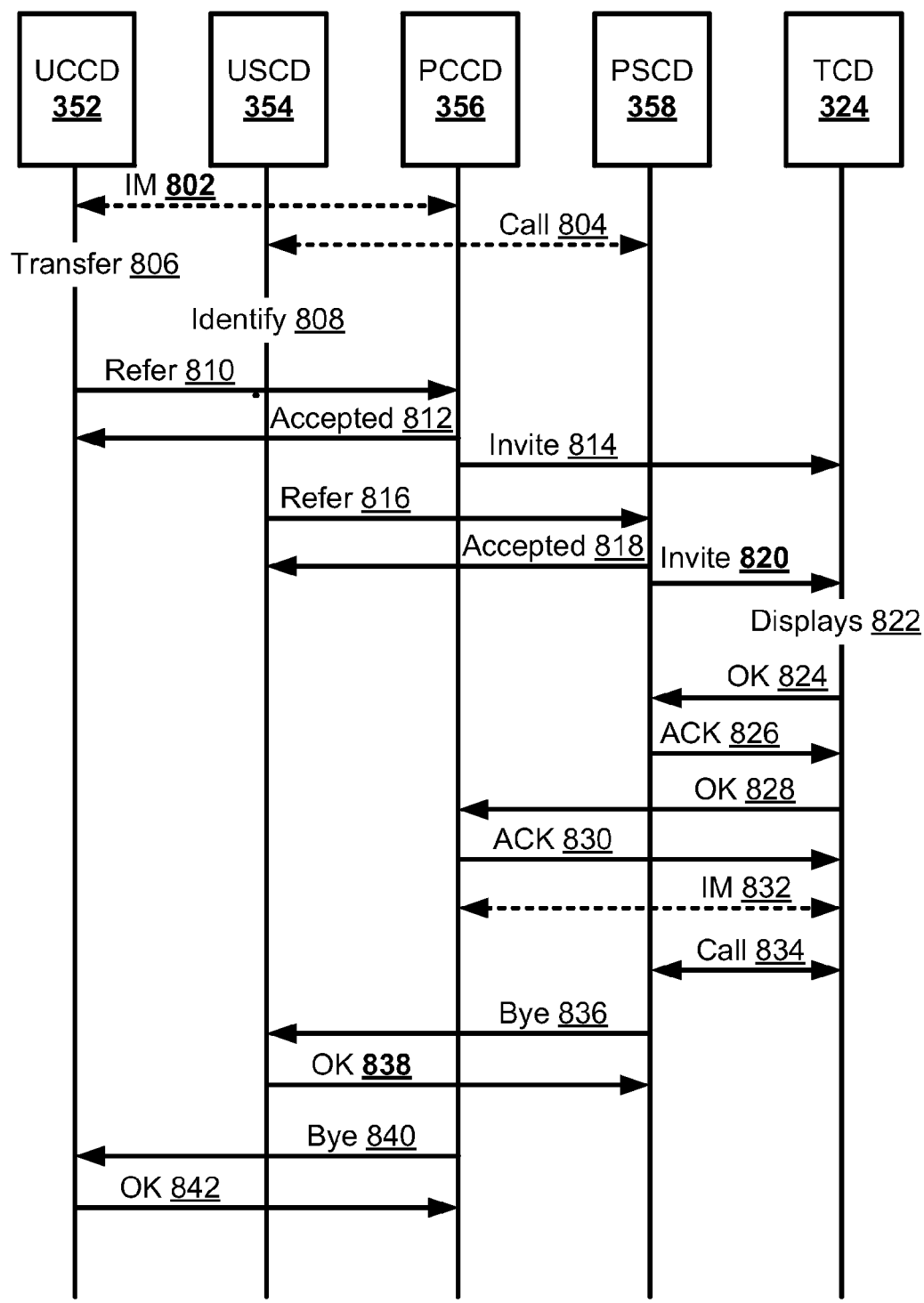

FIG. 8 illustrates, in a call flow diagram, one embodiment of a method for independent endpoint multimodal call transfer.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

A multimodal conversation may be a single conversation using multiple communication sessions each having a different communication mode, such as instant messaging (IM), telephone, video, and other communication modes. The multimodal conversation may have a single conversation identifier (CID) associated with each communication session of the multimodal conversation.

A user may have multiple points of presence (NMPOP) on a communication network. A point of presence may refer to an endpoint by which a user controls and interacts with the user's end of a communication session. The user may have MPOP represented by a single communication device capable of communicating over multiple communication modes, such as a personal computer executing a communication software package capable of IM, voice, video conferencing, application sharing, and other communication modes. The user may also have MPOP represented by associating multiple communication devices with a single user, such as a personal computer, an internet telephone, a personal texting device, and other communication devices. Multiple communication devices may be "paired" together to execute multimodal conversations. Pairing the communication devices allows a user to use a single communication device to control other communication devices representing the MPOP of that user.

A multimodal conversation may have a first communication session having a first communication mode and a second communication session having a second communication mode. A first user point of presence may execute a first transfer of the first communication session with a first partner point of presence from the first user point of presence to a first target point of presence. A second user point of presence may execute a second transfer of the second communication with a second partner point of presence from the second user point of presence to a second target point of presence.

Figure 1:
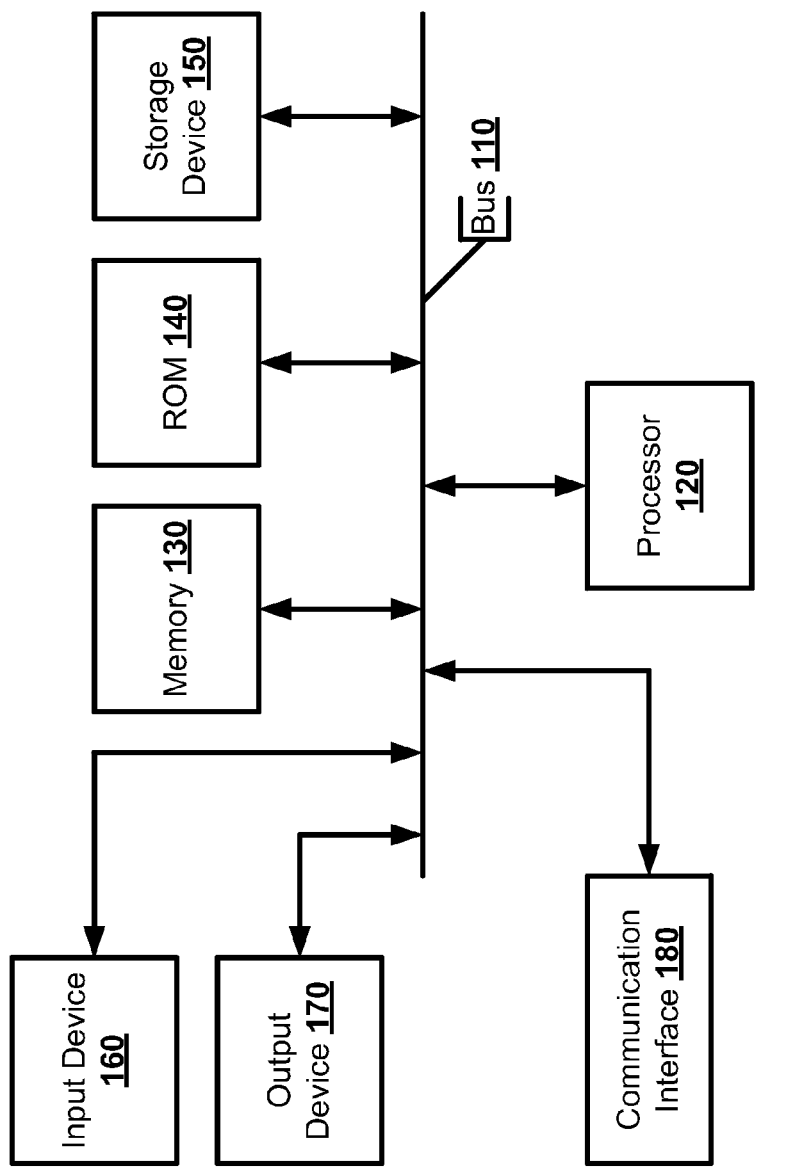
FIG. 1 illustrates a block diagram of an exemplary communication device that may be used in multimodal conversations.

FIG. 1 illustrates a block diagram of an exemplary communication device 100 which may be used in multimodal communications. Communication device 100 may be a personal computer, laptop, an internet protocol (IP) telephone, or other communication device capable of acting as an independent communication device. Communication device 100 may include a bus 110, a processor 120, a memory 130, a read only memory (ROM) 140, a storage device 150, an input device 160, an output device 170, and a communication interface 180. Bus 110 may permit communication among the components of communication device 100.

Processor 120 may include at least one conventional processor or microprocessor that interprets and executes a set of instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of tangible machine-readable medium, such as, for example, magnetic or optical recording media and its corresponding drive.

Input device 160 may include one or more conventional mechanisms that permit a user to input information to communication device 100, such as a keyboard, a mouse, a voice recognition device, a microphone, a headset, etc. Output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate with other devices or networks. Communication interface 180 may include a network interface or a pairing interface. The interface may be a wireless, wired, or optical interface. In one embodiment, the interface may include a universal serial bus (USB) interface, a Bluetooth® interface, or other such interface that may be used to attach peripheral devices or pair other communication devices.

Communication device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Each communication device associated with a user may act as a point of presence for that user. Multiple communication devices may be more easily managed by "pairing". FIG. 2 illustrates in a block diagram one embodiment of a set 200 of paired communication devices. A server communication device (SCD) 210 may be a communication device that may act as a server and may directly connect with another communication device. SCD 210 may be an internet protocol (IP) telephone, a computer, or other communication device that may independently create a communication link with another communication device. SCD 210 may execute a server-side unified communications software application that creates a call connection with another communication device using a peer-to-peer protocol.

A controller communication device (CCD) 220 may be a communications device that may act as a controller for SCD 210. CCD 220 may act as an independent communication device, capable of setting up a communications link independent of SCD 210. CCD 220 may be an IP telephone, a computer, or other independent communication device. CCD 220 may execute a client-side unified communication software application that enables control of SCD 210.

CCD 220 may pair 230 with SCD 210 using a variety of techniques. CCD 220 may create a data link with SCD 210 using a universal serial bus (USB) connection, an Ethernet connection, a Bluetooth® connection, or other type of data connection. A communication software program executed by CCD 220 may then interact with a communication software program executed by SCD 210. SCD 210 and CCD 220 may act as an integrated system once paired. SCD 210 may act as CCD 220 in one instance and SCD 210 in a different instance, and vice versa. CCD 220 may eschew an intermediary server when pairing directly with SCD 210. CCD 220 may use a third party control protocol (TPCP) to observe, initiate, and control sessions between CCD 220 and any remote device connected to SCD 210.

While SCD 210 and CCD 220 are referred to as being "paired" 230, more than two devices may be associated with each other. For example, an ancillary communication device (ACD) 240 may be paired with SCD 210 and CCD 220. ACD 240 may be an IP telephone, computer, or other communication device that may execute a communication mode over a communication connection.

FIG. 3a illustrates, in a block diagram, one embodiment of a multimodal conversation 300 using a user communication system having communication devices capable of multiple modes of communication. A multimodal conversation 300 may be associated with a CID 302, in order to more efficiently manage each mode of the multimodal conversation 300. Multimodal conversation 300 may have a first mode communication session (MCS) 304 and a second MCS 306. Although two communication sessions with different modes for a single multimodal conversation are described, a multimodal conversation may have any number of communication sessions each having a different communication mode. Each MCS may operate in different modes, such as IM, telephone conversation, application sharing, video conferencing, or other modes of communication. Each MCS of the multimodal conversation 300 may be associated with the same CID 302.

A user may be associated with a first user point of presence (UPOP) 308 to interact with first MCS 304 and a second UPOP 310 to interact with second MCS 306. A single user communication device (UCD) 312, capable of performing multiple modes of communication, may execute both first UPOP 308 and second UPOP 310. The user may seek to create a communication link with a communication partner. The communication partner may be associated with a first partner point of presence (PPOP) 314 to interact with first MCS 304 and a second PPOP 316 to interact with second MCS 306. A single partner communication device (PCD) 318, capable of performing multiple modes of communication, may execute both first PPOP 314 and second PPOP 316.

The user or the communication partner may transfer a communication session between the user and communication partner to a transfer target. The transfer target may be associated with a first target point of presence (TPOP) 320 to interact with first MCS 304 and a second TPOP 322 to interact with second MCS 306. A single target communication device (TCD) 324, capable of performing multiple modes of communication, may execute both first TPOP 320 and second TPOP 322. First UPOP 308 may directly transfer the first MCS 304 to first TPOP 320 and second UPOP 310 may directly transfer the second MCS 306 to second TPOP 322 regardless of whether the multimodal conversation was initiated by the user or the communication partner.

FIG. 3b illustrates, in a block diagram, one embodiment of a multimodal conversation 350 using a user communication system having paired communication devices, with each device capable of a different mode of communication. The user may be associated with a user CCD (UCCD) 352, acting as first UPOP 308, and a user SCD (USCD) 354, acting as second UPOP 310. The communication partner may be associated with a partner CCD (PCCD) 356, acting as first PPOP 314, and a partner SCD (PSCD) 358, acting as second PPOP 316. The transfer target may be associated with a target CCD (TCCD) 360, acting as first TPOP 320, and a target SCD (TSCD) 362, acting as second TPOP 322.

FIG. 4 illustrates, in a flowchart, one method 400 of transferring a multimodal conversation. The user may track a multimodal conversation by CID 302. First UPOP 308 may execute a first MCS 304 with first PPOP 314 (Block 402). Second UPOP 310 may execute a second MCS 306 with second PPOP 316. Alternately, if first UPOP 308 resides on UCCD 352 and second UPOP 310 resides on USCD 354, UCCD 352 may direct USCD 354 to execute the second MCS 306 between second UPOP 310 and second PPOP 316 (Block 404). Upon deciding to transfer the communication sessions, the user may execute a consultation with a transfer target communication partner (Block 406). The transfer target communication partner may be associated with first TPOP 320 and second TPOP 322 on TCD 324. Alternately, the transfer target communication partner may be associated with first TPOP 320 on TCCD 360 and second TPOP 324 on TSCD 362. The consultation may be with the transfer target communication partner via first TPOP 320 or second TPOP 322. Upon approval by the transfer target communication partner, first UPOP 308 may execute a first transfer of the first MCS 304 to first TPOP 320 (Block 408).

First UPOP 308 may alert first TPOP 322 of the second MCS 306 (Block 410). First UPOP 308 may determine the mode capability of second TPOP 322, to see if second TPOP 322 is capable of executing a second MCS 306 (Block 412). First UPOP 308 may check the mode capability by asking the transfer target communication partner during the consultation process, by including the query in the invitation message for the first communication session, by making a connection attempt with second TPOP 322, or by some other method. If second TPOP 322 is capable of executing second MCS 306 (Block 414), then first UPOP 308 may execute a second transfer of second MCS 306 to second TPOP 322 (Block 416). If second TPOP 322 is incapable of executing second MCS 306 (Block 414) and a suitable alternate communication mode is available (Block 418), then second UPOP 310 may switch second MCS 306 to an alternate mode communication session (Block 420). First UPOP 308 may then execute a second transfer of second MCS 306 to second TPOP 322 (Block 416). If no alternate mode is available (Block 418), then first UPOP 308 may drop second MCS 306 (Block 422).

First UPOP 308 may use a separate conference server to transfer first MCS 304 and second MCS 306. FIG. 5 illustrates, in a flowchart, one method 500 of transferring a multimodal conversation using a conference server. The conference server may connect to first MCS 304 and second MCS 306 (Block 502). The conference server may part the different modes of the multimodal conversation by assigning a first mode CID (MCID) to first MCS 304 and a second MCID to second MCS 306 (Block 504). The conference server may invite first TPOP 320 to join first MCS 304 and second TPOP 322 to join second MCS 306 (Block 506). Once the conference server detects first TPOP 320 connecting with first MCS 304 and second TPOP 322 connecting with second TPOP 306 (Block 508), the conference server may reassign a new CID to first MCS 304 and second MCS 306 (Block 510). The conference server may then sever its connection with first MCS 304 and second MCS 306 (Block 512).

First UPOP 308 may transfer a communication session using a variety of methods. FIG. 6 illustrates, in a call flow diagram, one embodiment of a method 600 for a user initiated, target completed multimodal call transfer. A user may transfer a multimodal conversation between the user and a communication partner to a transfer-target TCD 324 may execute both a first TPOP 320 and a second TPOP 322. UCCD 352, or first UPOP 308, may have an IM communication session 602 established with PCCD 356, or first PPOP 314. USCD 354, or second UPOP 310, may have a real time protocol (RTP) call communication session 604 established with PSCD 358, or second PPOP 316. The user may initiate a transfer action 606 to the transfer target. UCCD 352 may send a session initiation protocol (SIP) REFER message 608 to PCCD 356. REFER message 608 may have a header listing, in addition to the transfer target, a set of transfer data for the call communication session 604, including a communication mode, and a set of uniform resource identifiers (URIs), such as a global routable user agent (UA) URI (GRUU) for a device, a CID identifying the connected call sessions, a source tag, and a target tag. PCCD 356 may send an "Accepted" message 610 to UCCD 352 upon receipt of REFER message 608. PCCD 356 may send an SIP INVITE message 612 to TCD 324. INVITE message 612 may have the same header information as REFER message 608. If the transfer-target initiates an acceptance action 614, TCD 324 may send an OK message 616 to PCCD 356, which PCCD 356 may respond to with an acknowledgement (ACK) message 618. PCCD 356 may now have an IM communication session 620 with TCD 324. PCCD 356 may now sever the IM communication session 602 with UCCD 352 with a BYE message 622, which UCCD 352 may acknowledge with an OK message 624. TCD 324 may initiate a second communication session by sending an SIP INVITE message 626 to PSCD 358. INVITE message 626 may have a header listing a replacement call ID, a replacement source rag, a replacement target rag, and other routing data. PSCD 358 may accept INVITE message 626 by sending an OK message 628 to TCD 324, which TCD 324 may acknowledge with an ACK message 630. PSCD 358 may now sever the call communication session 604 with USCD 354 with a BYE message 632, which USCD 354 may acknowledge with an OK message 634. PSCD 358 may now have a RTP call communication session 636 with TCD 324.

A single point may be master of all the communication sessions or may be controlling the other communication session through a remote call control protocol. FIG. 7 illustrates, in a call flow diagram, one embodiment of a method 700 for a user point of preference controlled multimodal call transfer. UCCD 352 may have an IM communication session 702 established with PCCD 356. USCD 354 may have a RTP call communication session 704 established with PSCD 358. The user may initiate a transfer action 706 to the transfer target. UCCD 352 may send a SIP REFER message 708 to the PCCD 356. REFER message 708 may have a header listing the transfer target. PCCD 356 may send an "Accepted" message 710 to UCCD 352 upon receipt of REFER message 708. PCCD 356 may send an SIP INVITE message 712 to TCD 324. INVITE message 712 may have the same target information as REFER message 708. UCCD 352 may send a SIP REFER message 714 to PSCD 358. REFER message 714 may have a header listing the transfer target, a call ID, a source tag, and a target tag. PSCD 358 may send an "Accepted" message 716 to UCCD 352 upon receipt of REFER message 714. PSCD 358 may send an SIP INVITE message 718 to TCD 324. INVITE message 718 may have a header listing target information and communication mode. TCD 324 may execute a display action 720 to display to the user a merged control panel for controlling all the communication sessions associated with the call ID. TCD 324 may accept INVITE message 718 by sending an OK message 722 to PSCD 358, which PSCD 358 may respond to with an ACK message 724. TCD 324 may accept INVITE message 712 by sending an OK message 726 to PCCD 356, which PCCD 356 may respond to with an ACK message 728. TCD 324 may now have an IM communication session 730 with PCCD 356 while having a RTP call communication session 732 with PSCD 358. PSCD 358 may now sever the call communication session 704 with USCD 354 with a BYE message 734, which USCD 354 may acknowledge with an OK message 736. PCCD 356 may now sever the IM communication session 702 with UCCD 352 with a BYE message 738, which UCCD 352 may acknowledge with an OK message 740.

The endpoints in a communication session may act independently. Each endpoint may be equipped with a conversation state package. A conversation state pack may be a software application to monitor and maintain status information about the multimodal conversation so that each point of presence may act accordingly. FIG. 8 illustrates, in a call flow diagram, one embodiment of a method 800 for independent endpoint multimodal call transfer. UCCD 352 may have an IM communication session 802 established with PCCD 356. USCD 354 may have a RTP call communication session 804 established with PSCD 358. The user may initiate a transfer action 806 to the transfer target. A conversation state package on the USCD 354 may execute an identification action 808 to determine that a transfer action 806 is underway, so that USCD 354 may commence its own transfer action as a result. UCCD 352 may send a SIP REFER message 810 to the PCCD 356. REFER message 810 may have a header listing the transfer target. PCCD 356 may send an "Accepted" message 812 to UCCD 352 upon receipt of REFER message 810. PCCD 356 may send an SIP INVITE message 814 to TCD 324. INVITE message 814 may have the same target information as REFER message 810. USCD 354 may send a SIP REFER message 816 to PSCD 358. REFER message 816 may have a header listing the transfer target. PSCD 358 may send an "Accepted" message 818 to UCCD 352 upon receipt of REFER message 816. PSCD 358 may send an SIP INVITE message 820 to TCD 324. INVITE message 820 may have a header listing target information and communication mode. TCD 324 may execute a display action 822 to display to the user a merged control panel for controlling all the communication sessions associated with the call ID. TCD 324 may accept INVITE message 820 by sending an OK message 824 to PSCD 358, which PSCD 358 may respond to with an ACK message 826. TCD 324 may accept INVITE message 814 by sending an OK message 828 to PCCD 356, which PCCD 356 may respond to with an ACK message 830. TCD 324 may now have an IM communication session 832 with PCCD 356 while having a RTP call communication session 834 with PSCD 358. PSCD 358 may now sever the call communication session 804 with USCD 354 with a BYE message 836, which USCD 354 may acknowledge with an OK message 838. PCCD 356 may now sever the IM communication session 802 with UCCD 352 with a BYE message 840, which UCCD 352 may acknowledge with an OK message 842.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above description may contain specific derails, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A method performed on a computing device that includes a processor and memory, the method comprising: transferring, by the computing device from a first device to a second device, a multimodal conversation with the computing device, where the multimodal conversation includes a plurality of communication sessions, where each of the plurality of communication sessions has a mode that is different than the modes of others of the plurality of communication sessions.

2. The method of claim 1 where the transferring the multimodal conversation comprises transferring, by the computing device, each of the plurality of communication sessions from the first device to the second device.

3. The method of claim 1 where the transferring comprises switching, by the computing device in response to determining that a mode of one of the plurality of communication sessions is not supported by the second device and to determining that an alternate mode is supported by the second device, the one of the plurality of communication sessions to the alternate mode.

4. The method of claim 1 where the transferring comprises dropping, by the computing device in response to determining that a mode of one of the plurality of communication sessions is not supported by the second device and to determining that an alternate mode is not supported by the second device, the one of the plurality of communication sessions.

5. The method of claim 1 where the transferring is based on a session initiation protocol ("SIP").

6. The method of claim 1 where the transferring is in response to results of a consultation between the computing device and the second device.

7. The method of claim 6 where the consultation comprises determining, by the computing device, a mode capability of the second device.

8. A system comprising a computing device and instructions that are together configured for performing actions, the computing device comprising a processor and memory, the actions comprising: transferring, by the computing device from a first device to a second device, a multimodal conversation with the computing device, where the multimodal conversation includes a plurality of communication sessions, where each of the plurality of communication sessions has a mode that is different than the modes of others of the plurality of communication sessions.

9. The system of claim 8 where the transferring the multimodal conversation comprises transferring, by the computing device, each of the plurality of communication sessions from the first device to the second device.

10. The system of claim 8 where the transferring comprises switching, by the computing device in response to determining that a mode of one of the plurality of communication sessions is not supported by the second device and to determining that an alternate mode is supported by the second device, the one of the plurality of communication sessions to the alternate mode.

11. The system of claim 8 where the transferring comprises dropping, by the computing device in response to determining that a mode of one of the plurality of communication sessions is not supported by the second device and to determining that an alternate mode is not supported by the second device, the one of the plurality of communication sessions.

12. The system of claim 8 where the transferring is based on a session initiation protocol ("SIP").

13. The system of claim 8 where the transferring is in response to results of a consultation between the computing device and the second device.

14. The system of claim 13 where the consultation comprises determining, by the computing device, a mode capability of the second device.

15. At least one memory that comprises instructions that, based on execution by a processor of a computing device, configure the computing device to perform actions comprising: transferring, by the computing device from a first device to a second device, a multimodal conversation with the computing device, where the multimodal conversation includes a plurality of communication sessions, where each of the plurality of communication sessions has a mode that is different than the modes of others of the plurality of communication sessions.

16. The at least one memory of claim 15 where the transferring the multimodal conversation comprises transferring, by the computing device, each of the plurality of communication sessions from the first device to the second device.

17. The at least one memory of claim 15 where the transferring comprises switching, by the computing device in response to determining that a mode of one of the plurality of communication sessions is not supported by the second device and to determining that an alternate mode is supported by the second device, the one of the plurality of communication sessions to the alternate mode.

18. The at least one memory of claim 15 where the transferring comprises dropping, by the computing device in response to determining that a mode of one of the plurality of communication sessions is not supported by the second device and to determining that an alternate mode is not supported by the second device, the one of the plurality of communication sessions.

19. The at least one memory of claim 15 where the transferring is based on a session initiation protocol ("SIP").

20. The at least one memory of claim 15 where the transferring is in response to results of a consultation between the computing device and the second device, where the consultation comprises determining, by the computing device, a mode capability of the second device.

\* \* \* \* \*